④United States Patent [19] Stark, Jr.
[11] 3,879,633
[45] Apr. 22, 1975

[54] TELEVISION DEGAUSSING SYSTEM WITH SADDLE-TYPE COILS ADJACENT CRT CONE

[75] Inventor: John Stark, Jr., Indianapolis, Ind.
[73] Assignee: RCA Corporation, New York, N.Y.
[22] Filed: Aug. 4, 1966
[21] Appl. No.: 570,382

Related U.S. Application Data
[63] Continuation of Ser. No. 331,669, Dec. 19, 1963, abandoned.

[52] U.S. Cl. ................ 315/8; 335/284 X; 307/100; 317/157.5
[51] Int. Cl. ........................ H01f 13/00; H01j 31/20
[58] Field of Search ....... 315/8; 335/284; 317/157.5

*Primary Examiner*—Robert Segal
*Attorney, Agent, or Firm*—Eugene M. Whitacre; Paul J. Rasmussen

EXEMPLARY CLAIM

1 Degaussing apparatus for a television picture tube adapted to be energized periodically by alternating current of magnitude which initially is appreciable and which diminishes effectively to zero comprising in combination:

a pair of saddle type coils mounted respectively on opposite sides of the conical portion of said tube, each of said coils having two side conductor groups extending generally longitudinally of said tube along and from the large to the small end of said conical tube portion, side conductor groups being connected by end turns respectively at the large and small ends of said conical tube portion; and means connecting said coils to said source of alternating current in a manner to produce an alternating magnetic field within said picture tube.

17 Claims, 4 Drawing Figures

INVENTOR.
JOHN STARK, JR.
BY
W. H. Sprowagle

INVENTOR
JOHN STARK, JR.
BY

TELEVISION DEGAUSSING SYSTEM WITH SADDLE-TYPE COILS ADJACENT CRT CONE

This application is a continuation of my application, Ser. No. 331,669, filed Dec. 19, 1963, now abandoned.

This invention relates to a system for degaussing television receivers and particularly to the electromagnetic structures and operating circuits used to automatically degauss a cathode ray color picture tube.

The metallic mask and its supporting structure together with other metal parts used in conjunction with a shadow mask type of color television picture tube are subject to becoming magnetized both in shipment to, and continued use in, a consumer's home. Such magnetization is effected by bringing the picture tube into proximity with magnetizing fields associated with structures such as trucks, elevators and the like and also by exposure during use to influences such as the earth's magnetic field. Such random magnetization often adversely affects the performance of the color television receiver in which the picture tube is embodied. In the past the remedy for such magnetization has been a manual degaussing of the apparatus, an operation usually performed by a serviceman. It also has been the experience of users of such color television apparatus that the relocation or reorientation of the apparatus frequently required another degaussing in order to effect optimum performance in the new position.

It has been proposed previously to effect automatic degaussing of a color television picture tube by using the field neutralizing coil with which some prior art receivers were provided. Such a coil is wound around the picture tube in close proximity to the shadow mask and its supporting structure. When used for field neutralization purposes such a coil is energized with sufficient direct current to produce a magnetic field having a direction substantially parallel to the longitudinal axis of the tube. The magnitude and direction of the neutralization field is adjusted to be substantially equal and opposite to that component of the earth's magnetic field also extending substantially parallel to the longitudinal tube axis.

In order to effect automatic degaussing of the picture tube screen structure, it was proposed to energize the field neutralization coil with alternating current which initially had a substantial magnitude but which was gradually decreased to zero. While such a device and technique might have been entirely effective for the accomplishment of degaussing with smaller picture tubes, it has been found that, with the larger size of color picture tubes in current use, the apparatus is not satisfactory as a practical matter for the reason that it is difficult to produce a degaussing field of sufficient strength throughout the entire space which it is desired to demagnetize.

Furthermore, some of these prior art arrangements for automatically degaussing a picture have used circuit arrangements in which one or more relay contacts were employed for switching purposes. Contacts such as those previously employed have such disadvantages as becoming dirty causing faulty operation, and other defects tend to cause faulty operation, thereby rendering such devices unreliable for such use.

It, therefore, is an object of the present invention to provide an improved electromagnetic structure and operating circuit therefor to effect automatic degaussing of a television picture tube and associated magnetizable elements.

The present invention employs, as an element of the electromagnetic structure, two saddle type coils mounted on the generally conical portion of the picture tube between the viewing screen and the beam deflection yoke. These coils are connected so that current flows in the same direction in the coil conductors extending longitudinally of the tube. A substantially planar color purity shield surrounding the conical section of the tube and substantially perpendicular to the longitudinal tube axis is employed as a relatively low reluctance return path for the magnetic flux produced by the coil structure. The energizing circuit for the coils by which alternating current is supplied thereto has an element exhibiting a relatively high initial resistance thereby producing a relatively large voltage drop thereacross which voltage is applied to the degaussing coils by a circuit having an element exhibiting a relatively low initial resistance. Subsequent to the application of the alternating current to the energizing circuit the initially high resistance element decreases in resistance due to the heat generated by operation so as to decrease the voltage drop across it, and the initially low resistance element increases in resistance resulting from the decreased voltage applied to it and the degaussing coils until ultimately substantially no alternating current flows through the coils.

The invention is more fully described in the following specification taken in conjunction with the accompanying drawings in which.

Figure 1:
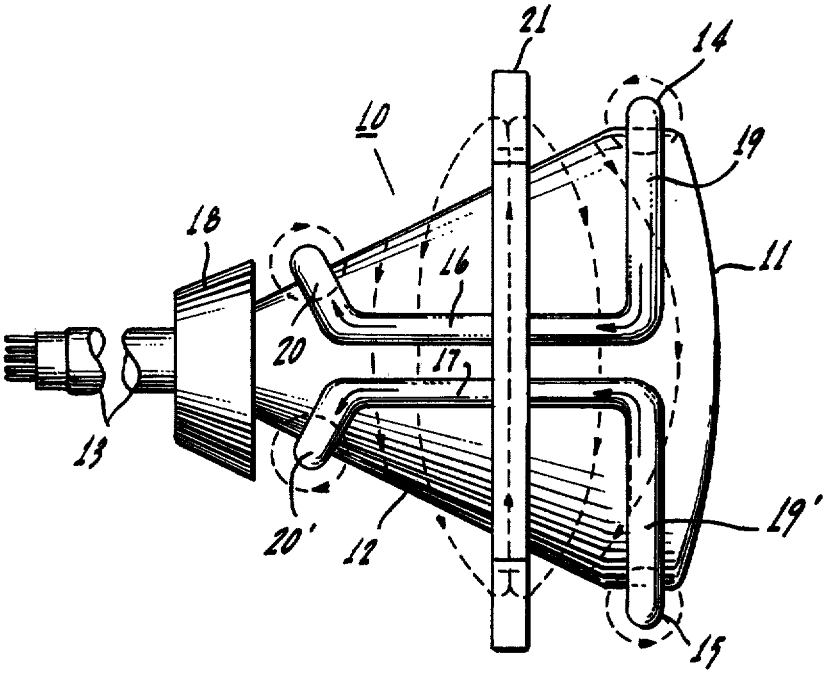
FIG. 1 is a top view of a shadow mask type color picture tube showing the electromagnetic coil structure in relation to the picture tube.
Figure 2:
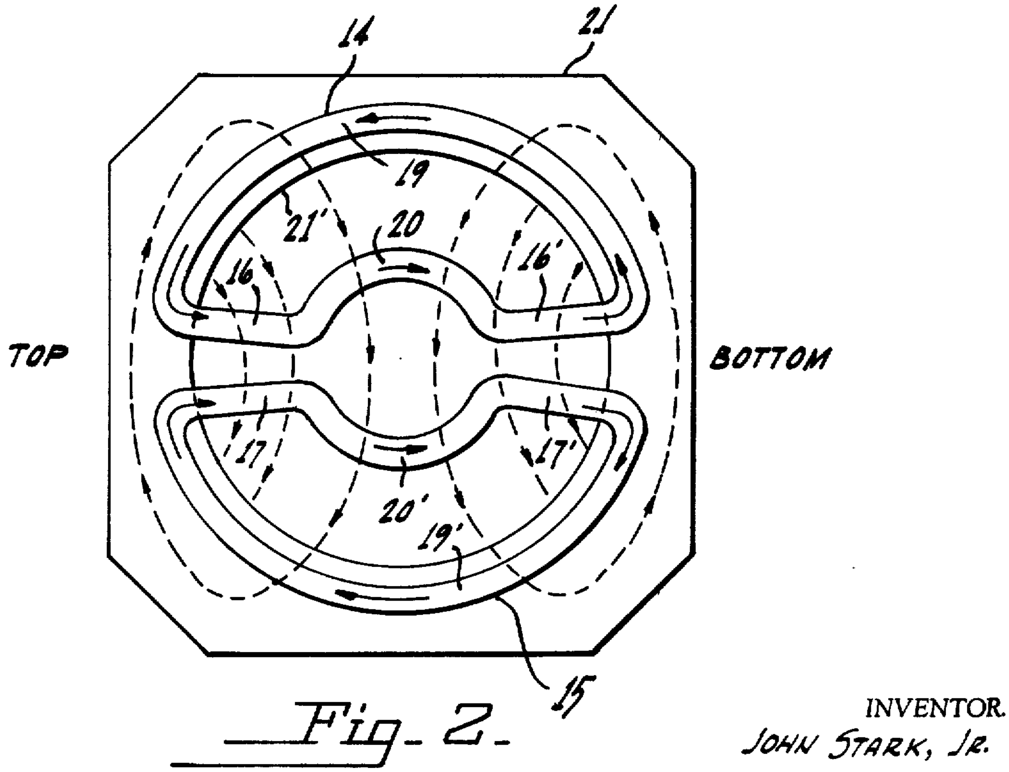
FIG. 2 is a view of the coil structure as seen from the front but with the picture tube omitted for clarity.

Reference first will be made to FIGS. 1 and 2. The color picture tube 10, which is of the shadow mask type such as a 21FJP22 tube described in a bulletin published in January 1961 by Radio Corporation of America, Harrison, N.J., has a face plate 11, a substantially conical portion 12 and a neck portion 13. Mounted on the conical section 12 of the picture tube are two saddle type degaussing coils 14 and 15 having two groups of conductors 16 and 17 respectively extending substantially longitudinally of the tube at the top thereof from a region adjacent the screen of the tube to a point just forward of the beam deflection yoke 18. This coil structure has similar groups of conductors 16' and 17' extending substantially longitudinally of the tube at the bottom thereof. The coil 14 has front and rear end conductors 19 and 20 respectively extending circumferentially about the tube joining the longitudinal conductors 16 and 16'. The coil 15 has similar end conductors 19' and 20' joining conductors 17 and 17'. A color purity shield 21 of magnetic material, which is substantially planar with a substantially circular aperture 21', is mounted perpendicularly to the longitudinal axis of the tube rearwardly of the screen and face plate 11 surrounding the conical portion 12 of the tube. Such a purity shield is used in color television receivers manufactured by Radio Corporation of America identified as Chassis CTC-12 covered by Color Television Service Data-File:1962 No. T6-distributed by RCA Sales Corporation, 600 North Sherman Drive, Indianapolis 1, Ind.

The two saddle type coils 14 and 15 are connected for energization in such manner that at a given instant the current flow in both groups of the top longitudinal conductors 16 and 17 is in the same direction from the front to the rear of the tube as indicated by the solid line arrows. At the same instant it will be understood that this current flows in the lower longitudinal conductors 16' and 17' in a direction from the rear to the front of the tube. Likewise current flow in front end conductors 19 and 19' is from tube bottom to tube top and in rear end conductors 20 and 20' is from tube top and in rear end conductors 20 and 20' is from tube top to tube bottom. Also, it will be understood that, at a succeeding instant when the direction of the alternating current energizing the coils 14 and 15 reverses, the described directions of current flow in the top longitudinal conductors 17 and 18, bottom longitudinal conductors 17' and 18', front end conductors 19 and 19' and rear end conductors 20 and 20' are in directions opposite to those indicated and described.

As a result of the described energization of the degaussing coils 14 and 15 there is produced in the screen region of the tube 10 a magnetic field extending from one side of the tube to the other in a manner similar to the vertical deflection field of a saddle-type deflection yoke. The direction of this field is alternating but at the instant of current flow represented by the solid line arrows such field has the direction as indicated by the broken line arrows in FIGS. 1 and 2.

Figure 3:
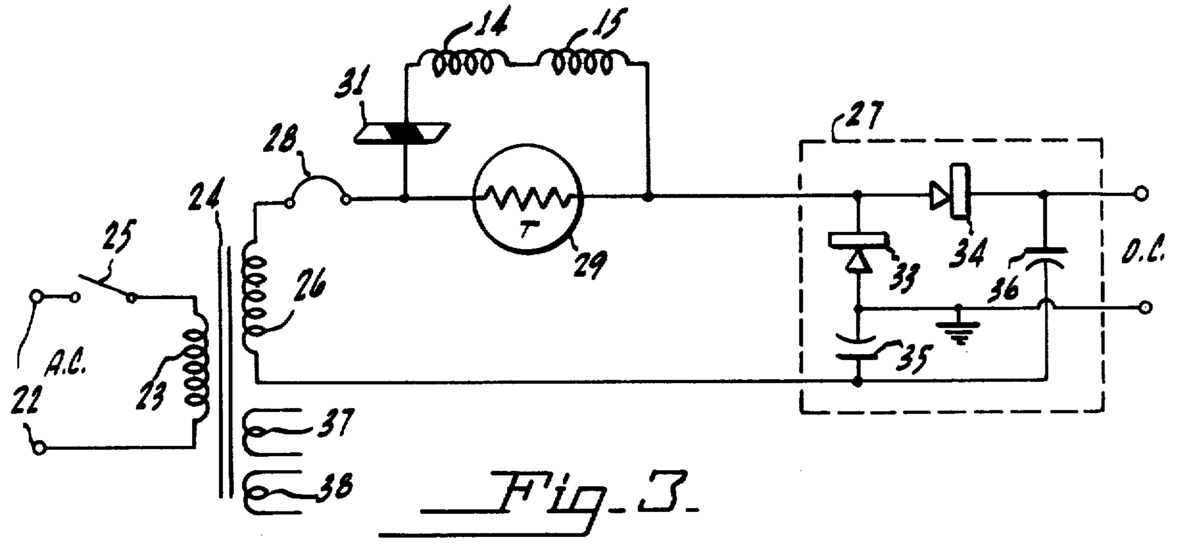
FIG. 3 is a schematic representation of one circuit arrangement for energizing the electromagnetic degaussing coils.

Referring now to FIG. 3 one circuit arrangement by which the degaussing coils 14 and 15 may be energized will be described. Alternating current derived from terminals 22 energizes the primary winding 23 of a transformer 24 upon closure of a switch 25 which conveniently may be the on-off switch for the television receiver in which the apparatus is embodied. Alternating current is induced in the secondary winding 26 of the transformer 24 and is connected to a power supply 27 for the television receiver by means of a circuit including a circuit breaker 28 and a thermistor 29. The thermistor is a device which when cool has a relatively high resistance but when hot has a relatively low resistance. The degaussing magnet coils 14 and 15 are energized by the voltage drop across the thermistor 29 in a circuit which includes a varistor (voltage dependent resistor) 31. The varistor is a device which has a relatively low resistance when a high voltage is impressed across it and a relatively high resistance when the impressed voltage is low. It will be observed that the resistive properties of the thermistor 29 and the varistor 31 are of a reciprocal nature.

The energization of the degaussing coils 14 and 15 is as follows, assuming that the thermistor 29 is cold, i.e. at room temperature. Immediately upon closure of the switch 25 the current flow through the thermistor 29 to the power supply 27 produces a relatively large voltage drop across the thermistor. At this time the resistance of the varistor 31 is low so that alternating current flows through the degaussing coils 14 and 15 at considerable amplitude. As a consequence, a relatively strong alternating field is established in the screen region of the picture tube. As the thermistor 29 warms in response to current flow therethrough its resistance decreases thereby decreasing the voltage drop thereacross. As a result of the decreased voltage the resistance of the varistor 31 increases thereby decreasing the current flow through the degaussing magnet coils 14 and 15. As a consequence, the strength of the alternating field produced in the picture tube decreases. The thermistor 29 ultimately heats sufficiently that its resistance and the voltage drop thereacross are very small so that the resultant voltage applied to the varistor 31 is so small that the current through it and the degaussing coils 14 and 15 is so small as to be effectively zero. Full alternating current voltage is applied to the receiver power supply 27 enabling it to supply the necessary direct current for the operation of the television receiver. With the effective deenergization of the degaussing coils 14 and 15 no further magnetic field is produced by the degaussing coils within the picture tube. At this point the metallic structures of the color picture tube 10 are substantially demagnetized.

The receiver power supply 27 includes diode rectifiers 33 and 34 and electrolytic capacitors 35 and 36. In the circuit arrangement of FIG. 3 where the degaussing apparatus is connected in the secondary circuit of the transformer 24 along with the power supply 27 there are produced alternating current pulses as a result of the charging current for the electrolytic capacitors 35 and 36. Also, the inclusion of the circuit breaker 28 in the arrangement affords protection for failures resulting from short circuits.

Figure 4:
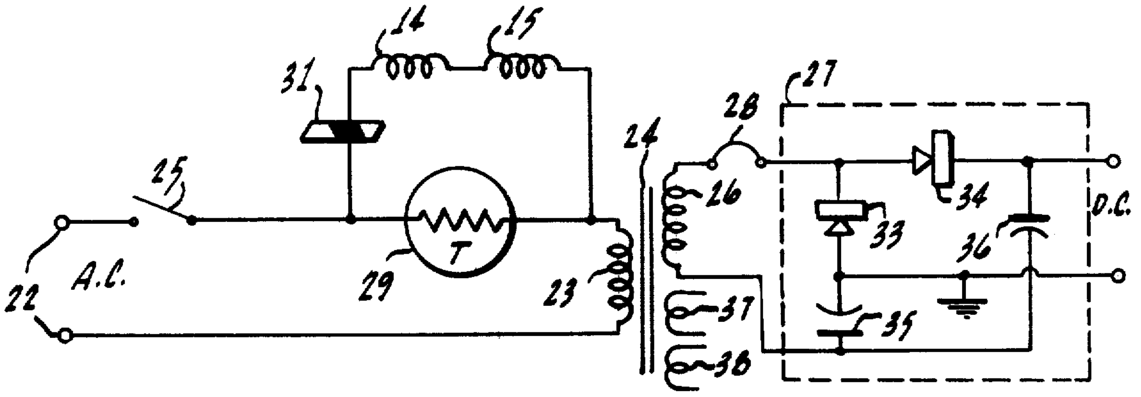
FIG. 4 is a schematic representation of another circuit arrangement for energizing the degaussing coil structure.

An alternative form of energizing circuit for the degaussing coils 14 and 15 is shown in FIG. 4 to which reference now is made. In this circuit the degaussing coils 14 and 15 together with the thermistor 29 and the varistor 31 are connected in circuit with the primary winding 23 of the power transformer 24. The circuit breaker 28 is connected in circuit with the secondary winding 26 of this transformer in series with the power supply 27 for the receiver. The operation of this circuit is similar to that described with reference to FIG. 3. In such a circuit arrangement there is produced initially in the primary transformer circuit a high surge voltage due in part to the relatively high current drawn from tertiary transformer heater windings 37 and 38 by the cold heaters of the electron tubes in the receiver and in part to the high charging current for the electrolytic capacitors 35 and 36 of the power supply.

The degaussing apparatus embodying the present invention is one which requires no special adjustment by the operator of the receiver nor any special activation other than the operation of turning the receiver on and off. Also, the apparatus is such that it operates every time that the set is turned on and left in such condition for a relatively short period of time such as that ordinarily required for the electron tubes of the receiver to warm up. The apparatus is effective to degauss the television picture tube and associated magnetizable elements in its vicinity irrespective of the position of the receiver and its orientation relative to the earth's magnetic field and other stray magnetic influences. This enables the positioning of the receiver in substantially any location in the user's home and also permits color television receivers to be designed for swivel operation much in the same manner as many black and white receivers are presently designed. The nature of the apparatus is such that, after the initial warm up period, no losses are introduced in the system and no heat is generated in its operation.

What is claimed is:

1. Degaussing apparatus for a television picture tube adapted to be energized periodically by alternating current of a magnitude which initially is appreciable and which diminishes effectively to zero comprising in combination:

a pair of saddle type coils mounted respectively on opposite sides of the conical portion of said tube, each of said coils having two side conductor groups extending generally longitudinally of said tube along and from the large to the small end of said conical tube portion, side conductor groups being connected by end turns respectively at the large and small ends of said conical tube portion; and means connecting said coils to said source of alternating current in a manner to produce an alternating magnetic field within said picture tube.

2. Degaussing apparatus for a television picture tube adapted to be energized periodically by alternating current of a magnitude which initially is appreciable and which diminishes effectively to zero comprising in combination:

a pair of saddle type coils mounted respectively on opposite sides of the conical portion of said tube, each of said coils having two side conductor groups extending generally longitudinally of said tube along said conical tube portion with each of said side conductor groups of one coil adjacent and substantially parallel to a side conductor group of the other coil, each of said coils also having a forward group of end turns connecting the forward ends of said side conductor groups and partially encircling one side of said tube adjacent the large end of said conical portion and a rear group of end turns connecting the rear ends of said side conductor groups and partially encircling one side of said tube adjacent the small end of said conical tube portion; and means connecting said coils to one another and to said source of alternating current in a manner to produce an alternating magnetic field in the vicinity of the viewing screen structure of said tube.

3. Degaussing apparatus for a television picture tube adapted to be energized periodically by alternating current of a magnitude which initially is appreciable and which diminishes effectively to zero comprising in combination:

a pair of saddle type coils mounted respectively on opposite sides of the conical portion of said tube, each of said coils having two side conductor groups extending generally longitudinally of said tube along said conical tube portion with each of said side conductor groups of one coil adjacent and substantially parallel to a side conductor group of the other coil, each of said coils also having a forward group of end turns connecting the forward ends of said side conductor groups and partially encircling one side of said tube adjacent the large end of said conical portion and a rear group of end turns connecting the rear ends of said side conductor groups and partially encircling one side of said tube adjacent the small end of said conical tube portion;

means connecting said coils to one another and to said source of alternating current in a manner to produce an alternating magnetic field within said conical tube portion and in the vicinity of the viewing screen structure of said tube; and a generally planar annular member of magnetic material mounted between said forward and rear groups of end turns perpendicular to the axis of said tube and surrounding said conical tube portion to serve as a relatively low reluctance return path for magnetic flux produced by said coils.

4. In a television receiver embodying a picture tube, degaussing apparatus for said picture tube comprising in combination:

a coil structure mounted in such relation to said picture tube as to produce when energized a magnetic field within said tube extending transversely to the longitudinal axis of said tube;

a power supply for said receiver including rectifier means for converting alternating current into direct current;

means including a transformer for impressing alternating current upon said power supply;

a first circuit including said transformer, said power supply and a thermistor having a relatively high resistance and large voltage drop thereacross when cool and a relatively low resistance and small voltage drop thereacross when hot;

a second circuit connecting said coil structure across said thermistor and including a varistor having a relatively low resistance when subjected to high voltage and a relatively high resistance when subjected to low voltage; and means including a switch which when closed impresses alternating current upon said transformer, thereby impressing alternating current of appreciable initial magnitude upon said coil structure due to the relatively large voltage drop across said thermistor with resultant low resistance of said varistor and which diminishes effectively to zero due to the decrease in voltage drop across said thermistor and the consequent high resistance of said varistor.

5. In a television receiver embodying a picture tube, degaussing apparatus for said picture tube comprising in combination:

a pair of saddle type coils mounted on opposite sides of and extending along the major portion of the conical section of said picture tube;

a power supply for said receiver including rectifier means for converting alternating current into direct current;

means including a transformer for impressing alternating current upon said power supply;

a first circuit including said transformer, said power supply and a thermistor having a relatively high resistance and large voltage drop thereacross when cool and a relatively low resistance and small voltage drop thereacross when hot;

a second circuit connecting said coils across said thermistor and including a varistor having a relatively low resistance when subjected to high voltage and a relatively high resistance when subjected to low voltage; and means including a switch which when closed impresses alternating current upon said transformer, thereby impressing alternating current of appreciable initial magnitude upon said coils due to the relatively large voltage drop across said thermistor with resultant low resistance of said varistor and which diminishes effectively to zero due to the decrease in voltage drop across said thermistor and the consequent high resistance of said varistor.

6. In a television receiver embodying a picture tube, degaussing apparatus for said picture tube comprising in combination:

a pair of saddle type coils mounted on opposite sides of and extending along the major portion of the conical section of said picture tube;

a generally planar annular member of magnetic material mounted intermediate the ends of said coils perpendicular to the axis of said picture tube and surrounding said conical tube section to serve as a return path for magnetic flux produced by said coils;

a power supply for said receiver including rectifier means for converting alternating current into direct current;

means including a transformer for impressing alternating current upon said power supply;

a first circuit including said transformer, said power supply and a thermistor having a relatively high resistance and large voltage drop thereacross when cool and a relatively low resistance and small voltage drop thereacross when hot;

a second circuit connecting said coils across said thermistor and including a varistor having a relatively low resistance when subjected to high voltage and a relatively high resistance when subjected to low voltage; and means including a switch which when closed impresses alternating current upon said transformer, thereby impressing alternating current of appreciable initial magnitude upon said coils due to the relatively large voltage drop across said thermistor with resultant low resistance of said varistor and which diminishes effectively to zero due to the decrease in voltage drop across said thermistor and the consequent high resistance of said varistor.

7. In a television receiver embodying a picture tube, degaussing apparatus for said picture tube comprising in combination:

a pair of saddle type coils mounted on opposite sides of and extending along the major portion of the conical section of said picture tube;

a generally planar annular member of magnetic material mounted intermediate the ends of said coils perpendicular to the axis of said picture tube and surrounding said conical tube section to serve as a return path for magnetic flux produced by said coils;

a power supply for said receiver including rectifier means for converting alternating current into direct current and capacitive means for filtering said direct current;

means including a transformer having a primary winding and a secondary winding for impressing alternating current upon said power supply;

a first circuit connecting said transformer secondary winding with said power supply and including a thermistor having a relatively high resistance and large voltage drop thereacross when cool and a relatively low resistance and small voltage drop thereacross when hot;

a second circuit connecting said coils across said thermistor and including a varistor having a relatively low resistance when subjected to high voltage and a relatively high resistance when subjected to low voltage; and means including a switch which when closed impresses alternating current upon said transformer primary winding, thereby impressing an initial surge of alternating current of appreciable magnitude upon said coils due to the relatively large voltage drop across said thermistor with resultant low resistance of said varistor and which diminishes effectively to zero due to the decrease in voltage drop across said thermistor and the consequent high resistance of said varistor, said initial surge of alternating current being caused at least in part by the relatively high charging current for said capacitive filtering means.

8. In a television receiver embodying a picture tube and a plurality of signal processing electron tubes, degaussing apparatus for said picture tube comprising in combination:

a pair of saddle type coils mounted on opposite sides of and extending along the major portion of the conical section of said picture tube;

a generally planar annular member of magnetic material mounted intermediate the ends of said coils perpendicular to the axis of said picture tube and surrounding said conical tube section to serve as a return path for magnetic flux produced by said coils;

a power supply for said receiver including rectifier means for converting alternating current into direct current and capacitive means for filtering said direct current;

means including a transformer having a primary winding, a secondary winding for impressing alternating current upon said power supply and at least one tertiary winding for energizing the heater elements of said electron tubes;

a first circuit including said transformer primary winding and a thermistor having a relatively high resistance and large voltage drop thereacross when cool and a relatively low resistance and small voltage drop thereacross when hot;

a second circuit connecting said coils across said thermistor and including a varistor having a relatively low resistance when subjected to high voltage and a relatively high resistance when subjected to low voltage; and means including a switch which when closed impresses alternating current upon said first circuit, thereby impressing an initial surge of alternating current of appreciable magnitude upon said coils due to the relatively large voltage drop across said thermistor with resultant low resistance of said varistor and which diminishes effectively to zero due to the decrease in voltage drop across said thermistor and the consequent high resistance of said varistor, said initial surge of alternating current being caused in part by the relatively high current drawn from said tertiary transformer winding by the cold heaters of said electron tubes and in part by the relatively high charging current for said capacitive filtering means.

9. Degaussing apparatus for a television picture tube adapted to be energized by alternating current of a magnitude which initially is appreciable and which diminishes effectively to a small value, comprising in combination:

a coil structure mounted in such relation to said picture tube as to produce when energized a magnetic field within said tube;

a power supply for said receiver including rectifier means for converting alternating current into direct current and capacitive means for filtering said direct current;

a source of alternating current;

circuit means connected between said source of alternating current and said power supply to impress alternating current upon said power supply;

said circuit means including current diverting means coupled to said coil structure, said current diverting means passing from an initial state obtaining at the initiation of said impressing of alternating current upon said power supply to an altered state subsequent to said initiation, said current diverting means (1) in said initial state, permitting alternating current to flow through said coil structure initially as a surge of appreciable magnitude which diminishes as a function of the charging of said capacitive means, and (2) in said altered state, diverting said alternating current from said coil structure, whereby to subsequently cause alternating current of no more than said small value to flow through said coil structure.

10. Degaussing apparatus for a television picture tube adapted to be energized by alternating current of a magnitude which initially is appreciable and which diminishes effectively to a small value, comprising in combination:

a power supply for said receiver including rectifier means for converting alternating current into direct current and capacitive means for filtering said direct current;

a source of alternating current;

circuit means connected between said source of alternating current and said power supply and operative to impress said alternating current upon said power supply, thereby producing an initial surge of alternating current of appreciable magnitude through said circuit means;

said initial surge of alternating current being caused at least in part by the relatively high charging current for said capacitive filtering means;

said circuit means including a coil structure connected in a first current path between said source of alternating current and said power supply so as to be traversed by said initial surge of alternating current and mounted in such relation to said picture tube as to produce a magnetic field within said tube when subjected to said surge of alternating current;

said circuit means also including disabling means operative subsequent to said initial surge of alternating current for reducing the alternating current through said coil structure to said small value, said disabling means providing a second current path between said source and said power supply and diverting said alternating current from said first current path to said second current path subsequent to said initial surge.

11. Degaussing apparatus as defined in claim 10, wherein:

said circuit means also includes a switch effective when closed to render said circuit means operative.

12. Degaussing apparatus as defined in claim 10, wherein:

said disabling means includes a heat responsive element.

13. In a color television receiver, a color picture tube having a display face with a plurality of different phosphors distributed across the display face, said phosphors in the plurality being effective to luminesce with visible light of particular colors when bombarded by electrons;

electron means for scanning the display face with electrons to excite the phosphor into luminescing with the particular colors;

a mask disposed in said tube between the face and said electron means, said mask being positioned to shield the different phosphors in the plurality from electrons representing different colors;

at least a pair of coils positioned adjacent the mask at spaced positions and extending in a direction transverse to the mask to produce a magnetic flux field in the mask without any dead spot at any position on the face of the color picture tube, and means coupled to the pair of coils for energizing the coils with a signal of decaying intensity to gradually reduce the intensity of the magnetic flux field in said mask and degauss the color picture tube.

14. In a color television receiver, a color picture tube having a display face;

groups of phosphors distributed across the face of said tube, the phosphors in each group being effective to luminesce with visible light of a particular color when bombarded by electrons;

electron means effective to scan the display face with electrons and excite preselected phosphors in each group into luminescence in accordance with such scan;

a mask disposed between the display face and electron means, said mark having a plurality of apertures aligned with the electron means and the phosphors in said groups to block preselected electrons from reaching the phosphors in all but one of said groups;

at least a pair of coils mounted adjacent the mask at spaced positions relative to the mask and disposed in a direction transverse to the mask to produce a magnetic flux field in the mask without any dead spot at any position on the display face of the tube, and means operatively coupled to the pair of coils for applying a signal to the coils to gradually reduce the intensity of the magnetic flux field produced by said coils for a degaussing of the face of the color picture tube.

15. In a color television receiver, a color picture tube having a display face;

groups of phosphors distributed across the face of said tube, the phosphors in each group being effective to luminesce with visible light of a particular color when bombarded by electrons;

electron means effective to scan the display face with electrons and excite preselected phosphors in each group into luminescence in accordance with the incidence of such electrons on the phosphors;

a mask disposed between the face and said electron means, said mask having a plurality of apertures aligned with the electron means and the phosphors in said groups to provide for preselected electrons to reach the phosphors in only one of said groups;

at least a pair of coils mounted adjacent the mask in a direction transverse to the mask and disposed in spaced relationship to each other to produce a magnetic flux field extending into the mask without any dead spot at any position on the display face of the tube; and means interconnected with the pair of coils to circulate a decaying magnetic flux field of alternating characteristics through the mask for a degaussing of the display face of the color picture tube.

16. In a color television receiver, a color picture tube having a display face with clusters including a separate primary phosphor in each cluster for each primary color;

a plurality of electron guns each being provided for a different one of the primary colors to scan said display face with electron beams, each gun being positioned to direct its beam of electrons onto the phosphor in each cluster having a particular primary color corresponding to the particular gun;

a mask disposed between the face and said electron guns, said mask having a separate aperture for each cluster and positioned in alignment with the electron guns and the respective primary phosphors in the cluster;

a pair of coils disposed in spaced relationship to each other and in transverse relationship to the mask to produce a magnetic flux field;

means mounting said coils adjacent and transverse to the mask and in spaced relationship to each other to direct the flux field through the mask;

current means connected in a circuit with the coils to circulate an alternating current through the coils for providing the magnetic flux field through the mask with alternating characteristics;

resistance means connected in the circuit with the coils for controlling the magnitude of the current through the coils in accordance with the value of its resistance;

actuatable switch means connected in the circuit with the current means and the coils upon the actuation of the switch means; and means coupled to the resistance means and the switch means for providing for a progressive change in the value of the resistance means in a direction to progressively decrease the current through the coils upon the actuation of the switch means.

17. In a color television receiver, a color picture tube having a display face;

clusters of phosphors distributed over the display face of said tube, each cluster including a plurality of separate primary phosphors each being provided for a different primary color;

a plurality of electron guns each being provided for a different primary color to scan said display face with an electron beam and direct a beam of electrons onto the phosphors having the particular primary color corresponding to the particular gun;

a mask disposed between the face and said electron guns, said mask having a plurality of apertures each being provided for an individual one of the clusters, the mask being made from a material having magnetic properties;

at least a pair of coils disposed outside of the tube and substantially normal to the mask and in magnetically coupled relationship to the mask, said coils being disposed on the opposite sides of the mask to produce in the mask flux fields that extend across the mask, and means interconnected with the coils to circulate an alternating current of decaying characteristics through the coils and produce a magneic flux field through the mask of decaying alternating characteristics to degauss the display face of the color picture tube.

* * * * *